Oct. 12, 1965  A. FERRARI ETAL  3,212,098
METHOD AND APPARATUS FOR PLURAL ROW PHOTOGRAPHY OF MOTION
PICTURES WITHOUT EXCHANGE OF REELS
Filed June 8, 1959  6 Sheets-Sheet 1

Inventor:
Alfredo Ferrari
Adolf Janes

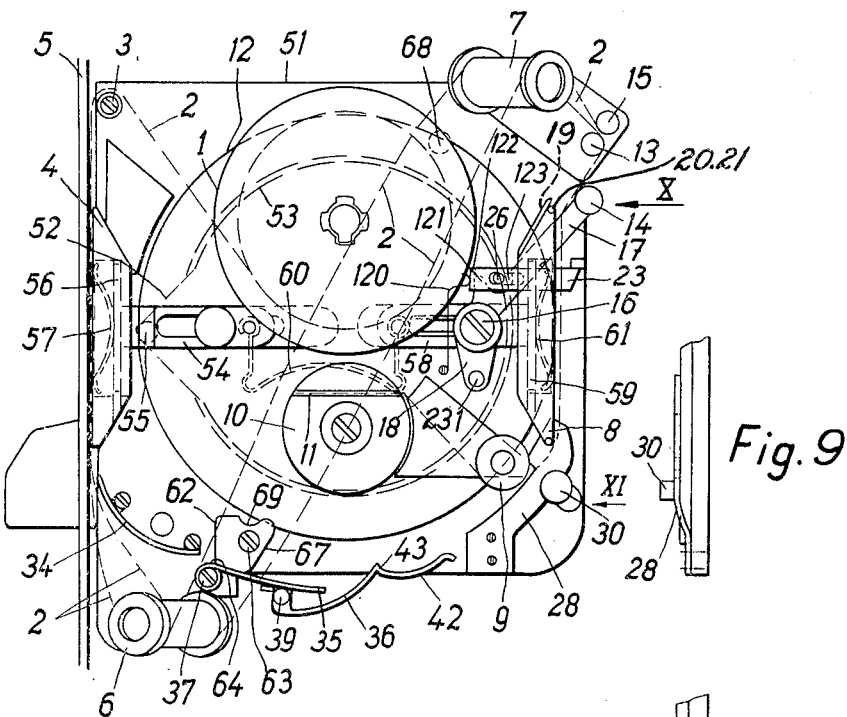
Fig. 7
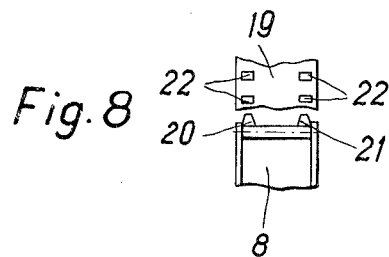
Fig. 8
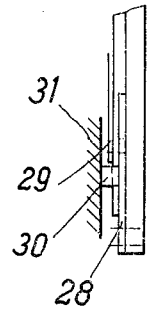
Fig. 9
Fig. 10

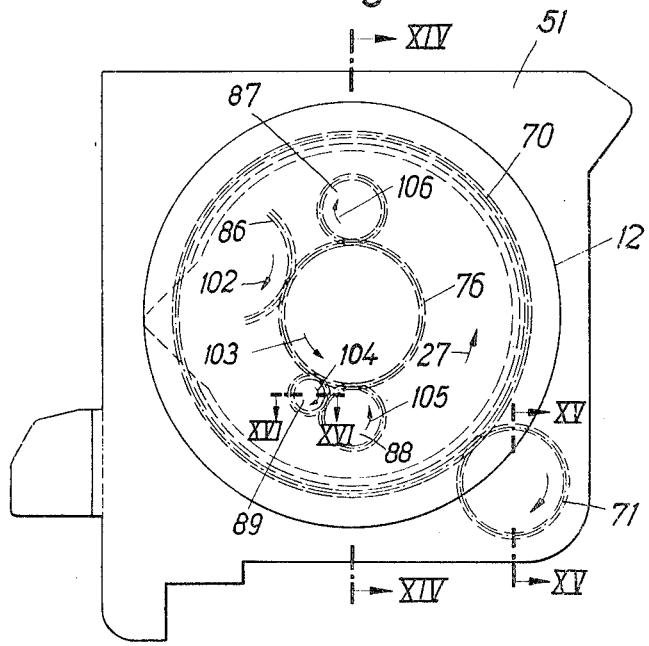
Fig. 11
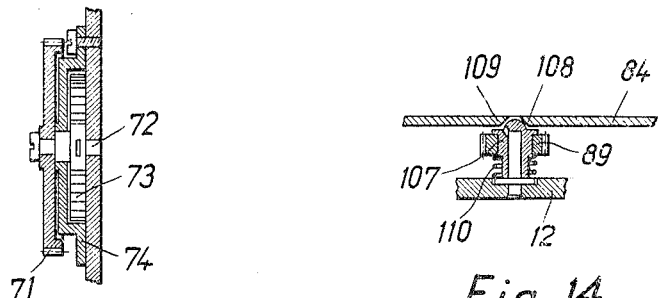
Fig. 13
Fig. 14

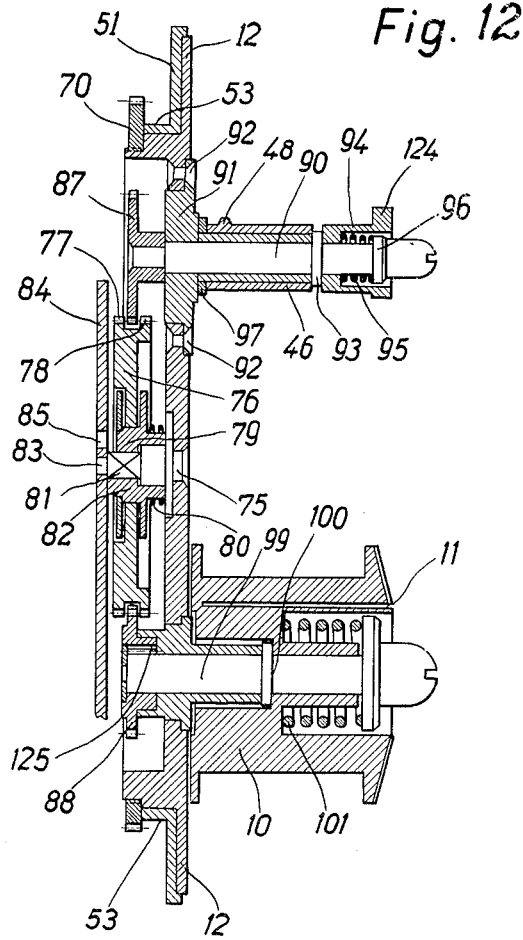

Inventor:
Alfredo Ferrari
Adolf James

United States Patent Office 3,212,098
Patented Oct. 12, 1965

3,212,098
METHOD AND APPARATUS FOR PLURAL ROW PHOTOGRAPHY OF MOTION PICTURES WITHOUT EXCHANGE OF REELS
Alfredo Ferrari and Adolf Gasser, Mauren, Liechtenstein, assignors, by mesne assignments, to Keystone Camera Company, Inc., Boston, Mass., a corporation of Massachusetts
Filed June 8, 1959, Ser. No. 818,873
Claims priority, application Austria, June 19, 1958, A 4,299/58; Oct. 17, 1958, A 7,245/58
13 Claims. (Cl. 352—46)

Cameras for motion pictures on parallel rows of a film, which before being shown is taken apart into component strips which are then aligned in true order with respect to perforations, picture arrangement and sequence, and combined to form a continuous strip, whereas the optical axis of the optical system used for photographing the pictures remains in the same position in the camera housing are already known. It has been attempted to provide for a movability of the optical system or the movement of several camera parts relative to other camera parts in order to eliminate the need for an exchange of spools as was previously required when the film had been unwound from the supply spool and exposed on the first component strip wound up on a second spool serving for temporarily holding the film. By this exchange the second component strip came into the position in which the optical axis of the system intersected the centre line of the strip when the film was advanced, without a change of the photographic lens relative to the camera. Such attempts have not been successful, however, because it was necessary to shield the movable parts against the incidence of light so that extremely complicated means were required to enable the light-tight accommodation of the film in the camera housing of such cameras for a prolonged time.

As contrasted therewith the present invention is based on the recognition that the film itself must be so influenced in the camera housing that it is moved as automatically as possible from the position in which its first component strip was exposed to the position in which the second component strip is exposed. This eliminates the need for any influence on the optical system and the camera housing so that measures to prevent entry of light need not be taken beyond the extent to which they are required in cameras requiring an exchange of spools.

The method and apparatus proposed to solve this problem for operating cameras for taking motion pictures on parallel strips of a film without an exchange of spools, which film before being shown is taken apart into these component strips, which are then aligned in true order with respect to perforations, picture arrangement and sequence and combined to form a continuous strip and in which the optical axis of the optical system used in taking the pictures remains in the same position in the camera housing, are characterized according to the invention in that the film is guided in the camera housing, which is held closed, the film is rotated through 180° after an exposure of pictures belonging to a first component strip, and in this position is wound back while the second component strip is exposed and while the film is being moved in direction opposite to that during the unwinding of the first component strip.

Whereas it is unsuitable to utilize the film so completely that by exposure of the last picture which can be made at all on the first component strip the film is completely unwound from the supply reel, this possibility is provided in a particularly suitable manner by the method. The method has the advantage that the length of the film can be completely utilized with the exception of the first part, which will be lost in any case during the insertion into the camera with access of light. On the other hand, the trailing end of the film must be re-threaded into the supply reel.

In order to effect the threading of the film into the supply reel, additional method steps and apparatus are required whereby the film feed movement, which is initiated to effect the exposure of the second component strip and the rewinding of the film on the supply reel after the exposed first film strip has been unwound from the supply reel, is blocked until a shielding of light has been effected.

The devices for carrying out such steps may be constructed in various ways.

Further details of the devices which have thus been basically defined will be explained with reference to the illustrative embodiment.

The drawings show illustrative embodiments of the invention. FIGS. 1 to 4 show diagrammatically the threading operation employed. FIGS. 5 to 19 show structural details of the camera according to FIGS. 1 to 4. FIG. 20 shows a modified embodiment of the camera.

Figure 5:
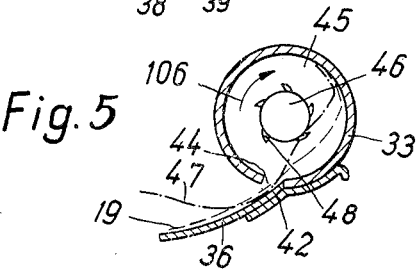

FIG. 5, in order to illustrate more clearly the relations concerned, shows only parts from FIGS. 1 to 4 on a scale which is enlarged with respect to FIGS. 1 to 4, in a stage at which the movements to be illustrated have further advanced.

Figure 6:
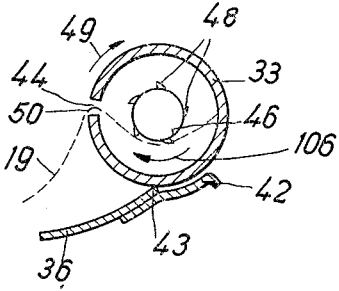

FIG. 6 is a view similar to FIG. 5 showing the parts concerned in the position in which the reversing operations have been completed so that the feeding of the film will take place thereafter in a new direction after the exposure of the second component strip has already begun when the film feeding direction was reversed. It is to be noted, however, that individual phases of an operation performed at very high speed are shown so that the exposure of the last component picture of the first component strip of the film is practically followed by the exposure of the first component picture of the second component strip of the film without a delay which would exceed the usual time of a change of frame.

FIG. 7 shows the actual construction of the camera.

FIG. 8 is a fragmentary view of the camera, taken in the direction of arrow X in FIG. 7.

FIG. 9 is a fragmentary view taken in the direction of the arrow XI in FIG. 7 before the fitting of the housing cover.

FIG. 10 shows the parts illustrated in FIG. 9 after the fitting of the cover.

FIG. 11 is a side view corresponding to FIG. 7 with some of the parts omitted for the sake of clarity.

FIG. 12 is a vertical longitudinal sectional view taken on line XIV—XIV of FIG. 11 and shown on twice the scale of FIG. 11.

FIG. 13 is a sectional view taken on line XV—XV of FIG. 11 through the spring housing of the drive for the turntable required for performing the reversing operations.

FIG. 14 illustrates a sectional view taken on line XVI—XVI of FIG. 11.

Figure 15:
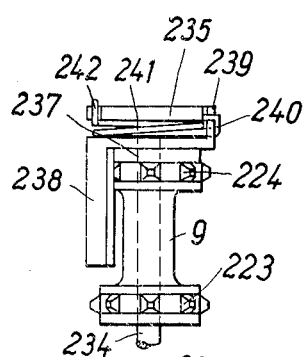
Figure 16:
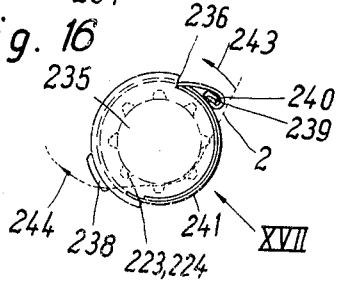

FIG. 15 illustrates a modification of the guide roller disposed before the stub reel, FIG. 15 is a view taken in the direction of the arrow XVII of FIG. 16, which illustrates an end view of the guide roller in the position before the reversal of the movement of the film.

Figure 18:
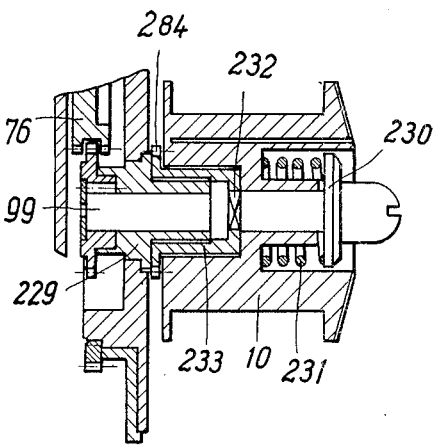
Figure 17:
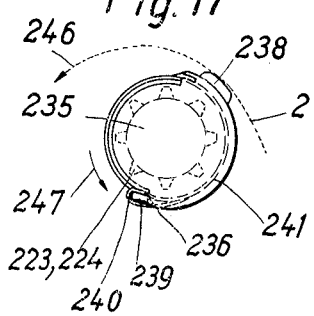

FIG. 17 is a view similar to FIG. 18 and shows the guide roller in the position after the reversal of the movement of the film.

FIG. 18 is a vertical longitudinal sectional view of the frictionally driven stub reel and illustrates the parts for frictionally driving the guide roller.

Figure 19:
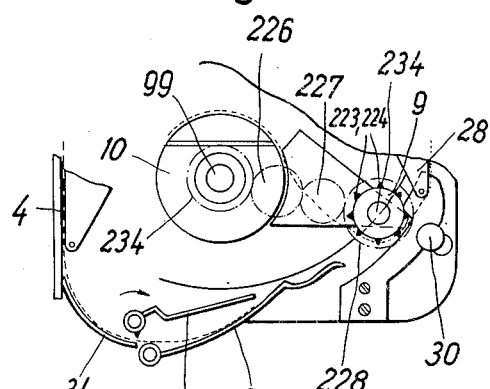

FIG. 19 shows the operative connection between the parts concerned.

Figure 1:
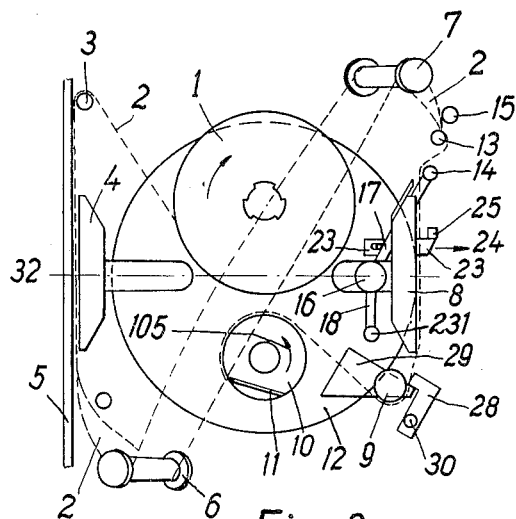
FIG. 1 shows somewhat diagrammatically a view of the essential parts of a motion picture camera according to the invention with the parts of the camera being in the film threading position.
Figure 2:
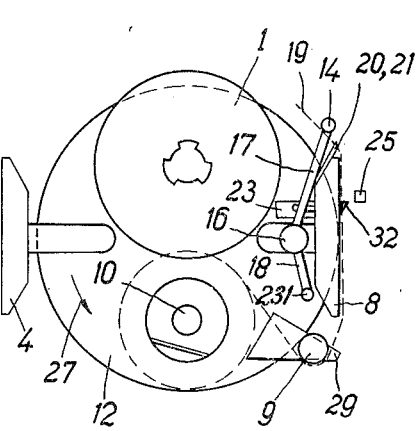
FIG. 2 is a similar view showing the same parts in another operational position after the exposure of the first component strip of the film.
Figure 20:
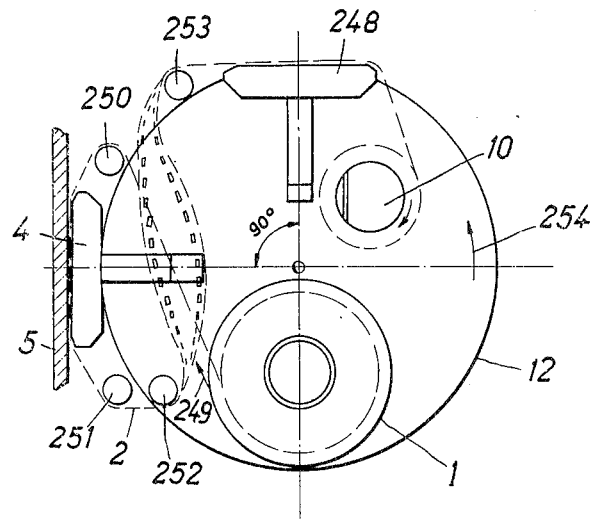

FIG. 20 shows a modification of FIGS. 1 and 2.

In FIG. 1, 1 is the supply reel, on which the film 2 is disposed. A stationary guide roller 3 in the camera housing causes the film to be deflected so that the same moves between the film pressure plate 4 and the film guide 5 at the picture gate. The picture gate itself, the optical system, the shutter and diaphragm means, the claws for feeding the film, their drive means, and means for reversing the feeding direction are known per se and for this reason have not been shown in order to avoid an overcrowding of the drawing.

A further deflection of the film 2 is effected by the oblique roller 6, which is also stationary in the housing. This is effected in such a manner that the film is guided in a direction which is diagonal to the giude at 4, 5. Adjacent to its diagonal path the film is guided in a plane which is parallel to the flanges of the supply reel 1. At this time the sensitized side of the film faces the viewer of FIG. 1 so that the sensitized layer cannot be mechanically damaged although there is no special guide for the film adjacent to its diagonal path. A second oblique roller 7 arranged in the camera housing ensures this diagonal guidance. Further on its path the film 2 is again moved past a second film pressure plate 8. Over a further deflection roller 9 it reaches the stub reel 10, which is slotted at 11 to enable a simple and convenient connection of the leading end of the film to the stub reel. A stub reel has been selected because it enables the film 2 completely wound up on the stub reel 10 to protrude into the space between the flanges of the supply reel 1, whereby the distance between the axes 99 and 90 (see FIG. 12) and with it the size of the camera housing can be minimized. The supply reel 1 and the stub reel 10 are arranged on a turntable 12, the rotation of which causes essentially the reversing operations required to cause the exposure of the second component strip of the film to follow in true order with respect to perforations, picture arrangement and sequence.

The guide roller 14 has now been arranged in the path of the film after it has left the oblique roller 7. Stationary guide rollers 13 and 15 are arranged before the guide roller 14 to ensure that the bending of the film caused by rollers 13, 15 increases the resistance to a withdrawal from the supply reel 1 to a predetermined minimum so that a certain tension is imparted to the film adjacent to the guide roller 14 by the withdrawing stub reel 10. This tension is so determined that the guide roller 14 arranged on a double-armed lever 17, 18, pivoted at 16, assumes the position shown in FIG. 1 in spite of the arrangement of a spring, not shown, which rotates the double lever 17, 18 in the counterclockwise sense. This will change immediately when the film has been entirely or almost entirely unwound from the supply reel 1 i.e., when the first component strip of the film has been entirely or substantially exposed. When the trailing end of the film reaches the vicinity of the oblique rollers 6, 7 the tension of the film between the guide roller 15, 13 will suddenly decrease so that the spring acting on the double-armed lever 17, 18 can pivotally move the guide roller 14 in the counterclockwise sense. This position of the parts is shown in FIG. 2. The trailing end of the film 2 is shown at 19, which becomes the leading end of the film during the exposure of the second component strip. The guide roller 14 has thus been enabled to impart to the free trailing end 19 of the film a short arcuate swing movement transverse to the plane of the film, again in the counterclockwise sense. This causes the projecting stationary spikes 20, 21 carried by the film pressure plate 8 to enter the perforations 22 of the trailing end 19 of the film as is apparent from FIG. 2 and more clearly from the side view shown in FIG. 8. This will safely locate the trailing or leading end 19 of the film at 20, 21 even if two opposite perforations 22 do not directly register with the spikes 20, 21. The next feed increment still continued in the original direction will cause the trailing end 19 of the film to slide over the spikes 20, 21 so that the trailing end of the film will be reliably caught at 20, 21.

The pivotal movement of the double-armed lever 17, 18 has an additional effect because the arm 17 acts on the locking member 23, which is longitudinally displaceably mounted on the turntable 12. The locking member 23 is under the action of a spring, which is indicated at 120 in FIGURE 7 and which tends to move the member 23 in the direction of arrow 24 beyond the rim of the turntable 12. As a result the locking member 23 is under the influence of the stationary stop 25 in the camera housing when the parts are in the position of FIG. 1. Consequently, the turntable 12, which tends to rotate in the counterclockwise sense under the action of a spring, which is not shown in FIG. 1 and indicated at 73 in FIG. 13, is held against such rotation. This changes when the double-armed lever 17, 18 moves from the position of FIG. 1 to that of FIG. 2. During this movement the arm 17 drives the locking member by means of a cam, which is indicated in FIG. 7 at 121 and carried by the locking member 23, and the right-angled bend 122 of the locking member in a direction opposite to the direction of arrow 24 so that the stationary stop 25 of the camera housing can no longer prevent a rotation of the turntable 12. The locking member 23 is guided by means of a guide pin 26 extending in an elongated hole 123 of the locking member 23.

Thus, the turntable 12 performs a rotation in the direction of the arrow 27 immediately after the parts have assumed the position of FIG. 2. This can only occur when the camera housing is completely closed. The turntable 12 is held against rotation once more by the stop 28 (see FIGS. 1 and 10), which consists of a flat spring and is arranged in the camera housing. In the locked condition of the turntable 12 the fixed stop 29 is in registry with the stop 28. The flat spring 28 carries the projecting pin 30 (see FIG. 1, 7, 9 and 10), which is arranged and constructed to assume the position of FIG. 10 when the cover 31 is mounted. In this position the flat spring 28 lies behind the stop 29, which consists of a thin plate, so that the turntable 12 is released for rotation in the position of FIG. 10 whereas it is locked against rotation when the cover 31 has not been fitted. For this reason it is not possible during the threading of the film, which is effected when the parts are in the position of FIG. 1, to initiate a premature rotation of the turntable 12 by an unintended actuation of the lever 17, 18 causing an unintended release of the lock at 23, 25. Such a premature rotation would be detrimental because it would considerably disturb the threading of the film 2. To facilitate the actuation of the lever the end of the lever arm 18 forms an actuating handle 21.

Figure 3:
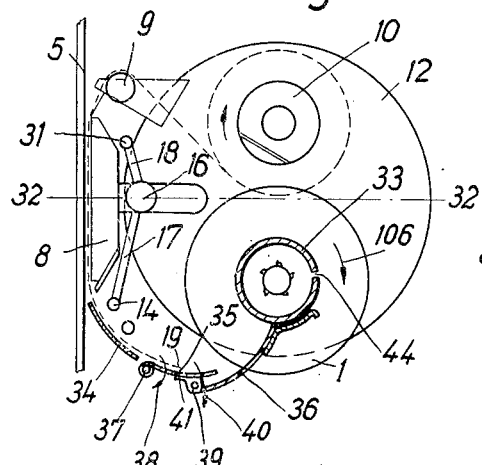
FIG. 3 is again a similar view showing the parts illustrated in FIGS. 1 and 2 in a position in which the movements which serve for exposing the second component strip have already been initiated but not yet completed.
Figure 4:
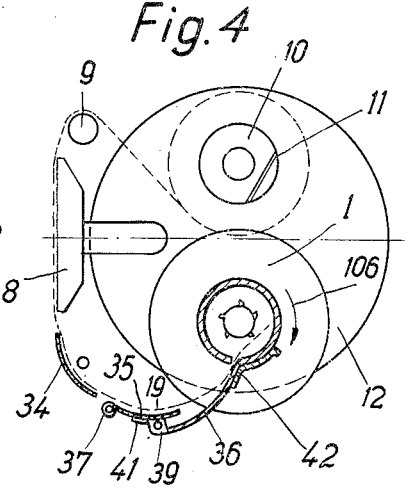
FIG. 4 shows the parts in a further advanced stage of the operation initiated in the position of FIG. 3.

The parts can thus assume the position of FIG. 2 only when the camera housing is completely closed. This means that the rotation of the turntable 12 is also effected under a light seal. This results in the position of the parts as shown in FIG. 3. The film supply reel 1, which in FIGS. 1 and 2 had been above the optical axis 32—32 of the optical system, not shown, is now below the same. The film pressure plate 8 urges now the film 2 against the film guide 5. The first feed increment of the film occurring in this position of the parts causes the film material forming the perforations 22 to be automatically lifted from the spikes 20, 21. Some additional feed increments of the film cause the film 2 to assume the position shown in FIG. 3. Now a film guide becomes effective, which consists of inherently rigid parts and which guides the film to the barrel 33 of the supply reel 1. This film guide consists in the first place of the part 34, which is fixedly arranged in the housing, further of the movable parts 35, 36. The guide part 35 is curved more strongly than the guide part 34 and capable of engaging the barrel 33. The guide part 35 is urged away, however, in the direction of arrow 38, except in the position of FIG. 3, by control means for the guide part 35. This control means is not shown in this figure but will be described hereinafter with reference to FIG. 7. As a result the rotation of the turntable 12 is not hindered before the parts have assumed the position of FIG. 3. The guide part 36 is rotatably arranged at 39 relative to the guide part 35 and a spring, not shown, tends to rotate the guide part 36 in the direction of the arrow 40 relative to the guide part 35. This movement is limited by a stop 41 engaging the guide part 35. The construction of the guide part 36 is shown with more detail in FIGS. 5 and 6. A further guide part 42 adjoins the guide part 36 so that a limiting isde face 43 corresponding to the thickness of the material of the guide part 36 is left free. This means that the guide part 36 can enter a slot 44 provided on the reel barrel 33 for receiving the trailing end 19 of the film when the supply reel 1 is in the position in which the slot is in registry with the side face 43. This position of the parts has been reached in FIGS. 4 and 5. As the supply reel is frictionally driven in a manner known per se, as will be described hereinafter, this blocking of the winding movement of the supply reel 1 will not cause breakage or disturbance. On the contrary, the previously fed trailing end 19 of the film can be caused to enter through the slot 44 the cavity 45 between the reel barrel 33 and the shaft sleeve 46 of the reel. This feeding movement of the trailing end 19 of the film had previously been effected, at the end of the rotation of the turntable 12 by a simultaneous reversal of the film feeding device into the direction opposite to that in which the film was fed during the exposure of the first film strip. This rotation of the turntable 12 had been terminated before the parts had assumed the position shown in FIG. 3. When received in the cavity 45 the trailing end 19 of the film assumes first the position shown with broken lines in FIGS. 4 and 5. As the barrel 33 is stationary owing to the blocking of the rotation at 43, 44, whereas the shaft sleeve 46 continues to rotate the projecting prongs 48 of the shaft sleeve 46 penetrate the perforations 22 of the trailing end 19 of the film (see dash-and-dot line position of the trailing end 19 of the film in FIG. 5). Thus the trailing end of the film is moved downwardly whereas the claws of the feeding device, not shown, continue the downward feed of the film at the same time. This results necessarily in a buckling of the film and the formation of an arc at 47 so that the side face 43 of the guide part 36 is urged out of the slot 44. The reel barrel 33 now performs its rotation in the direction of the arrow 49 in FIG. 6 so that the film is bent at 50 and driven along. In accordance therewith the film is wound up again on the barrel 33 of the supply reel 1 during the exposure of the second component strip and this winding is continued until the second component strip of the film has been fully exposed.

FIGS. 7 and 11 to 13 show the actual construction of the camera. The parts bearing the same designations in FIGS. 1 to 6 and 8 to 10 are identical with the parts described hereinbefore. It is seen that the turntable 12, the oblique rollers 6, 7, the leaf spring 28, the guide rollers 3, 13, 15, 9 etc. are arranged on a base plate 51, which carries all parts mentioned hereinbefore and on the rear of which the transmission is disposed, which will be described hereinafter. Further shown are the guides for the film pressure plates 4, 8. The film pressure plate just engaging the film guide 5 would interfere with the rotation of the turntable 12. For this reason the pressure plate must be controlled. This is effected by the projecting nose 52 of the guide collar 53 of the base plate 51 for the turntable 12. This permits a guide roller 55 connected to the slide 54 to assume the position shown in FIG. 7, in which a shoe 56 which is formed by the slide 54 and on which the film pressure plate 4 is fitted has assumed the position in which the film pressure plate 4 engages the film guide 5. The film pressure plate 4 is cushioned against the shoe 56 by means of the leaf spring 57. The same leaf spring causes the film pressure plate 4 and the shoe 56 in the position shown in FIG. 7 to interengage by means of appropriately disposed recesses and projections. For this reason only a slight pressing of the film pressure plate 4 against the shoe 56 is sufficient to eliminate the interengagement and permit of withdrawing and, if desired, replacing the film pressure plate. As soon as the turntable 12 moves from the position shown in FIG. 7 and corresponding in FIG. 1 to the position of FIG. 3 the collar 53 urges the roller 55 and with it the slide 54 and pressure plate 4 back towards the center of the turntable 12 so that the film pressure plate 4 cannot hinder the rotary movement of the turntable 12. The same collar 53 causes the film pressure plate 8, which is also guided by a slide 58 and under the influence of the guide roller, to assume the position shown in FIG. 3. The movements of the slides 54, 58, the latter carrying by means of a shoe 59 the film pressure plate 8, are performed against the action of the stirrup-shaped spring 60, which tends to urge both slides 54, 58 apart. The film pressure plate 8 is also fitted on the shoe and in its central position interengages therewith. A leaf spring 61 maintains both parts in their interengaged position.

FIG. 7 shows also the control means for the guide part 35. For this purpose the cam 62 is rotatably mounted at 63 on the base plate and with its cam face 64 engages the guide part 35 when the parts are in the position shown in FIGS. 7, 1 and 2. When the turntable 12 has almost completed its rotation during the transition from the position of FIG. 1 to that of FIG. 3, the projecting pin 68 on the turntable 12 will engage the recess 69 and will pivotally move the cam 62 about its pivot 63 in the clockwise sense. This causes the cam face 67 of the cam 62 to act on the guide part 35 so that the same begins to approach the turntable 12 because the cam face 67 is less spaced from the pivot 63 than the cam face 64. This will only occur when the supply reel 1 has reached the position shown in FIG. 3 so that the guide part 42 does not lie in the path of the barrel 33 during the pivotal movement of the turntable 12.

FIGS. 11 to 14 show the transmission required for performing the reversing operations. This transmission must comply with numerous requirements to avoid a mutual interference and hindrance of the several movements, e.g., no transmission parts must be rigidly interconnected during the rotation of the turntable 12 because this would prevent a rotation of the turntable 12. On the other hand, all transmission parts must be maintained in interengagement to ensure that they will not be relatively displaced under the influence of forces due to inertia, which are inevitable during the very quickly succeeding movements, and which displacement would have disturbing results during the continued operation of the transmission. Furthermore, the transmission should not contain parts subjected to wear, such as clutches, whereby the necessary reliability and regularity of the reversing operations would be eliminated. All transmission parts must be accommodated within a very small space, practically within the narrow space between the base plate and the cover plate. Further requirements will be referred to during the subsequent transmission of the cover plate.

These numerous objects are basically accomplished by a sun wheel, the axis of rotation of which coincides with that of the turntable 12. This sun wheel has two mutually spaced gear rims which are arranged like an annular disc, and which is axially displaceable and can rotate like an annular disc in unison with the rotation of the turntable 12 around a hub to cause revolving movements of additional transmission wheels in mesh with the gear rims of the sun wheel.

FIGS. 11 and 12 show again the base plate 51 and the turntable 12. The base plate 51 forms the above-mentioned collar 53, which in addition to controlling the rollers 55 of the slides 54, 58 serves as a bearing for the rim of the turntable 12. The turntable 12 has a gear rim 70, by which the turntable 12 is driven by means of the gear wheel 71 (see FIGS. 11 and 13). The gear wheel 71 is carried by the shaft 72 which together with the spring 73 surrounding it is accommodated in the spring housing 74. The spring ends are located on the one hand on the shaft 72 and on the other hand on the spring housing 74. This spring 73 is already prestressed when the turntable 12 is in the position shown in FIG. 1 so that the turntable will automatically perform its movement in the sense of the arrow 27 (see FIG. 2) when the locks 28, 29 and 23, 25 of the turntable have been released. On the other hand the return rotation involving a re-stressing of the spring 73 is effected by hand before the film is threaded in the position of FIG. 1.

The turntable 12 carries the central shaft 75 (FIG. 12), on which the sun wheel 76 with its two gear rims 77 and 78 is rotatably arranged. To carry the sun wheel 76 forming an annular disc, a special hub 79 is provided, which is axially displaceable on the shaft 75 and under the action of a spring 80. A polygonal section 81 of the shaft 75 prevents a relative rotation of the parts 75, 80 and 79. The hub 79 carries projecting cams 82 having bevelled side faces. At least three cams are provided in order to prevent the occurrence of unilateral forces. A second bearing for the shaft 75 is provided at 83 in the cover plate 84, which is relatively closely spaced from the base plate 51. The cover plate 84 has recesses 85 which are so spaced that they can receive the cams 82 when the hub 79 is moved toward the cover plate 84.

The sun wheel 76 is constantly in mesh with the drive wheel 86 of the drive means of the camera. This is usually a spring-driven mechanism but this spring-driven mechanism may be replaced by any other drive means, such as an electric motor or a different drive means. The sun wheel 76 is also in mesh with the gear wheels 87 and 88 in certain axial positions of the sun wheel 76. Moreover, a change wheel 89 is provided, which has been shown in FIG. 14 because it is also axially adjustable. The gear wheel 87 serves for driving the supply reel 1 by means of the carrying and drive shaft 90 thereof. The shaft 90 (FIG. 12) is mounted in a bearing member 91, which is inserted in the turntable 12 and connected thereto by being riveted at 92. The bearing member 91 carries the shaft sleeve 46 having projecting prongs 48. The shaft 90 forms at 93 a friction flange, which is engaged by the driver sleeve 94 under the pressure of the spring 95. The axial pressure of the spring 95 is taken up by the abutment flange 96 of the shaft 90. Thus, the supply reel 1 is frictionally driven by the driver cam 124, which enters a corresponding recess in one of the flanges which limit the supply reel 1 on its sides. On the other hand, the shaft sleeve 46 is urged by the friction disc 97 against the friction flange 93 so that the shaft sleeve 46 is also frictionally driven.

The gear wheel 88 serves also for frictionally driving the stub reel 10, the film receiving slot of which is indicated at 11. The shaft 99 driven by the gear wheel 88 has also at 100 a friction flange, against which the stub reel 10 is urged by the spring 101. However, whereas the gear wheel 87 is rigidly connected to the shaft 90, the gear wheel 88 is connected to the shaft 99 by a free-wheel for overrunning clutch device 125, which is only sketched and may be constructed like the known free-wheel hubs for bicycles, having inclined faces in engagement with rollers which are so disposed in the resulting wedge-shaped spaces that the hub is driven in one direction whereas free-wheeling occurs in the other direction.

The gear wheel 88 can mesh with the change wheel which is apparent in FIGS. 11 and 14 and which is also in mesh with the sun wheel 76 in certain axial positions.

The following specific remarks are made with respect to the positions of the transmission.

The position of the transmission parts shown in FIGS. 11 and 12 will result in the position of the parts shown in FIG. 1 where the transmission parts are omitted for the sake of clarity and simplicity. This means that the position is shown in which the film is threaded. The gear wheels 70 and 71 are in mesh as has been described hereinbefore. As a result, the turntable 12 rotates in the direction of the arrow 27 (FIG. 2) when its two locks have been released. In this position of the parts the stub reel 10 must be driven to make the camera ready for the exposure of the first component strip after the threading of the film. This drive of the stub reel 10 is effected by means of the change wheel 89 because this is in mesh with the gear rim 77 of the sun wheel as well as with the gear wheel 88 whereas the free-wheel of the latter is ineffective. Because the drive wheel 86 for the sun wheel 76 rotates in the clockwise sense as indicated by the arrow 102 in FIG. 11, the sun wheel 76 rotates in the direction of arrow 103 and the change wheel 89 rotates in the direction of arrow 104 the stub reel 10 winds up the film in the sense of the arrow 105 in FIGS. 11 and 1 whereas the gear wheel 87 disposed intermediate the gear rims 77, 78 of the sun wheel 76 does not affect the unwinding movement of the barrel 33 of the supply reel 1. These conditions prevail until the first component strip of the film has been exposed. As soon as this exposure has been terminated the tension of the film at the guide roller 14 decreases so that the double-armed lever 17, 18 is pivotally moved as has already been described. This causes the release of the lock 23 at the fixed stop 25 and an automatic rotation of the turntable 12 under the influence of the stressed spring 73 and of the meshing gears 71, 70. At the same time the feeding direction of the film is suddenly reversed, as has already been described. The film 2 must now be wound up back on the supply reel 1. This means that the gear wheel 87 is now to be driven whereas the stub reel 10 must idle. For this purpose the apertures 85 in the cover plate 84 are so related to the cams 82 of the hub 79 of the central wheel 76 that they are just in registry with the cams 82 when the turntable 12 has been turned through 180° relative to FIG. 11. Under the pressure of the spring 80 the sun wheel 76 springs forward toward the cover plate 84 so that the gear wheel 87 comes into mesh with the gear rim 78 of the sun wheel 76. In the position of FIG. 11 the rotation of the turntable 12 through 180° has caused the gear wheel 87 to be in the position of gear wheel 88 and the gear wheel 88 to be in the position of gear wheel 87. As a result, the drive movement 102 and the continued movement in the direction of arrows 103 and 106 causes the re-winding of the trailing end 19 of the film and, consequently, of the film 2 on the barrel 33 of the supply reel 1. When the apertures 85 in the cover plate had been in registry with the cams 82 of the hub 79 of the sun wheel 76, the rounded top 108 of the hub 107 of the change wheel 89 was in registry with the aperture 109 in the cover plate 84—see FIG. 14—so that the change wheel 89 was automatically axially advanced toward the cover plate 84 under the influence of the spring 110. This has eliminated the mesh between the gear wheels 89 and 88 whereas the gear wheel 89 has come into mesh with the gear rim 77 of the sun wheel 76 and the gear wheel 88 has come into mesh with the gear rim 78 of the sun wheel 76. Nevertheless no difficulties are involved in unwinding the film from the stub reel 10 because the free-wheel 125 in the drive wheel 88 for the stub reel is effective so that the drive of the gear wheel 88 by means of the gear rim 78 and gear wheel 88 in the direction 105 opposite to that of the unwinding of the film from the stub reel remains ineffective.

In this way the film is re-wound on the supply reel 1 while the second component strip is exposed. At the termination of this exposure the film 2 has been fully wound up again on the supply reel 1 and the exposed complete film can be taken from the camera. After the removal of the film the turntable 12 is turned by hand from the position of FIG. 6 to the position of FIG. 1. The stub reel 10 and the parts connected to the reel shaft 90 may be used as handles for this operation. Manual forces will be sufficient to bring the spring 73 back to its initial spring stress and to overcome the resistance of the springs 80 and 110 in conjunction with the inclined contours of the cams 82 and of the apertures 109. Thus the sun wheel 76 and the change gear 107 are returned to their original position. The camera is now prepared for exposing a new film wound on a supply reel 1.

FIGS. 15 to 19 show a modification of the roller 9 and stub reel 10 compared to the previously described figures.

In FIGS. 15 to 19, 9 is the guide roller having sprocket wheels 223, 224, the prongs of which are intended to enter the perforations of the film so that a positive drive of this guide roller 9 causes a positive feed movement of the film owing to the engagement of the prongs with the perforation 22 of the film (FIG. 8). For this purpose the guide roller 9 is driven, as is indicated in FIG. 18, by a part 76 (FIG. 12) of the transmission, which serves according to FIG. 18 for the frictional drive of the stub reel 10. The drive is transmitted to the guide roller 9 from the part 76 by the gear wheels 226, 227, 228. This transmission part is designated 229 in FIG. 18. It serves at the same time to guide the shaft 99 of the stub reel 10, which is frictionally driven by this shaft by means of the spring plate 230 and the spring 231. The shaft 99 has a polygonal portion 232, on which the gear wheel bush 233 is shrunk. This gear wheel bush 233 has a flange which forms the gear wheel 284, which serves for positively driving the guide roller 9 by means of the gear wheels 226, 227 according to FIG. 19.

As is further shown in FIG. 15 the guide roller 9 rotates with the sprocket wheels 223, 224 on a shaft 234, which is terminated by an end disc 235. The end disc 235 has the shape which is apparent from FIG. 16 and which is characterized by the formation of the stop 236. Loosely rotatably mounted on the shaft is a further disc member 237, which forms the arm 238 extending parallel to the shaft 234. The disc member 237 forms at 239 a short arm, which extends parallel to the shaft 234 and lies in the loop 240 of a volute spring 241, the other end of which is located at 242 in the end disc 235. The loop spring 241 tends to rotate the stop 236 of the disc member 237 in FIG. 16 in the counterclockwise sense in the direction of arrow 243. 2 designates the film, which is fed in the direction 244. Having been wound up on the stub reel 10 according to FIG. 19 the tension occurring in the film during the fed movement enables the film to urge the arm 238 to the position shown in FIG. 16, in which the arm 238 does not prevent the prongs of the sprocket wheels 223, 224 from entering the perforations 22 of the film. As a result the guide roller 9 being positively driven by the transmission part 76 (see FIG. 18) positively pulls the film 2 by means of the sprocket wheels 223, 224 before the film is wound up on the non-positively driven stub reel. This changes after the movement of the film is reversed, which takes place automatically as soon as the film has been completely exposed on its first component strip and has been entirely or almost entirely wound up on the stub reel 10. In accordance with earlier proposals the turntable 12, not shown here, which carries the parts shown in FIG. 19, with the exception of the release 30 but inclusive of the guide parts 34, 36 and 245—the latter ensures a correct guidance of the film even if the trailing end of the film is strongly bent —is rotated through 180° at this time and at the same time the feed direction is reversed. This causes the guide roller 9 to assume the position shown in FIG. 17, in which the film 9 is now fed in the direction of arrow 246. As a result the arm 238, which is still under the action of the spring 241 tending to rotate the arm in the direction of the arrow 247, urges the film 2 away from the sprocket wheels 223, 224 so that its perforations 22 are disengaged from the sprocket wheels 223, 224. This eliminates the positive feed movement of the film 2. As has been stated hereinbefore the feed movement is now effected under the action of frictionally driven film supply reel, on which the film is wound back after the first component strip has been exposed and while the second component strip is being exposed. As contrasted with the position of the parts shown in FIG. 17 the tension occurring in the film 2 when the parts are in the position of FIG. 17 cannot move the arm 238 from its position in which it urges the film out of the sprocket wheels 223, 224 because the arm 238 or the loop 240 of the loop spring 241 now engages the stop 236, which prevents a continued rotation of the arm 238 in the direction of arrow 247; on the contrary, the tension occurring in the film 2 ensures now the engagement of the parts 239, 240 with the stop 236 so that the arm 238 is held in its position in which it maintains the film 2 outside of the range of the sprocket wheels 223, 224 so that the arm 238 under the influence of the loop spring 241 will retain its position precluding a positive drive of the film 2 even when the tension of the film decreases. After the movement of the film has been reversed in the position of FIG. 17 the film 2 must not be positively driven by the guide roller 9 and the sprocket wheels 223, 224 because the feed direction of the film has been changed which is maintained even when the turntable 12 has been rotated through 180°. Whereas the positive drive of the guide roller 9 might also be reversed this is not necessary because after the rotation of the turntable 12 through 180° the operative connection of the parts shown in FIG. 19 causes the guide roller 9 to assume a position in which it lies in the path of the film being withdrawn immediately behind the stub reel 10 so that the movement is not subjected to obstructions which would require a positive drive. Besides, a reversing gear would require a much larger number of parts and more space than the arm 238 which directly surrounds the guide roller 9 so that the device constructed according to the invention is not only particularly simple and space-saving but also requires only a few, uncontrolled parts.

FIG. 20 shows an embodiment in which the turntable 12 is not rotated through 180° but only through 90° to enable the trailing end of the film, which has been wound up from the supply reel 1 during the exposure of the first component strip to be swung to the position in which it becomes the leading end of the film during the exposure of the second component strip.

For this reason the stationary guide rollers 250 and 251 are arranged behind the supply reel 1 in the film feed direction 249 in which the film 2 is unwound from the supply reel 1. These rollers 250 and 251 are followed by the guide roller 252 arranged on the turntable 12. Another stationary guide roller is provided at 253. At 248 the second film guide is provided, which is at angle of only 90° to the first film guide 9. Between the guide rollers 252 and 253 the film is twisted through 180° to be wound up in this condition on the stub reel 10. When the film 2 has been fully wound up on the stub reel 10 after the exposure of the first component strip it is sufficient to rotate the turntable through 90° in the direction of arrow 254 to enable an exposure of the second component strip.

It is within the nature of the invention that it is not exhausted by the embodiments shown. E.g., it is not essential to unwind the film completely from the reel 1 during the exposure of the first component strip. For instance by the provision of perforations in the last portion of the wound-up film and by scanning the perforations by a special device the feed movement might be blocked and the rotation of the turntable 12 might be initiated before the film 2 has been completely unwound from the barrel of the reel 1. In this case special measures for catching and retaining the trailing end of the film are not required whereas the disadvantage is involved that the film is not exposed throughout its length.

What is claimed is:

1. The method of operating cameras the optical system of which has an optical axis which is invariable in position relative to the camera, for photographing motion pictures in mutually parallel strips on a film which is wound up on a supply reel and the width of which is substantially an integral multiple of the width of a component strip, whereafter the film having been exposed on the component strips without an exchange of film supply reels is taken apart into these component strips and before being shown the component strips are assembled in true order with respect to perforation, picture arrangement and sequence so as to form a continuous component strip film, said method comprising the steps of feeding the film in a predetermined direction so that the optical axis of the optical system intersects the film along an imaginary longitudinal line of symmetry of a first component strip and in a dark chamber sealed from light, exposing pictures on said first component strip of said film while unwinding the film from its supply, displacing the film while maintaining it sealed from light in said dark chamber after the exposure of said pictures, to turn the film through 180° relative to said first feeding direction until the optical axis intersects another component strip along an imaginary longitudinal line of symmetry of the same, while maintaining the film sealed against light, feeding the film in a direction which is opposite to said predetermined direction and re-winding said film and at the same time exposing that component strip of the film which now intersects the optical axis.

2. In a camera the optical system of which has an optical axis which is stationary relative to the camera housing, for making motion pictures in parallel longitudinal rows on a film strip, in combination, a camera housing, means for supporting a film supply reel, an additional reel for temporarily holding the film, means for supporting said additional reel, a pressure guide for the film adapted to hold the film in a plane at right angles to the optical axis during the exposure of a picture, means adapted to guide the film on a predetermined path outside the reels and pressure guide, means for twisting the film through 180° about its center line, means for reversing the feed direction of the twisted film into the opposite direction, and a device adapted to swing said supporting means with the film about an axis which is parallel to the plane of the film in the position for exposure.

3. In a camera as set forth in claim 2, said camera comprising further, in combination, means adapted to unwind the film from the reel which served for temporarily holding the film and to rewind the film on the supply reel when the film has been completely unwound from the supply reel and wound up on the reel for temporarily holding the film.

4. In a camera as set forth in claim 2, said camera comprising further, in combination, means adapted to retain the trailing end of the film unwound from the supply reel and prevent it from being wound up on the additional reel for temporarily holding the film.

5. In a camera as set forth in claim 2, said camera comprising further, in combination, means adapted to rethread into the supply reel the trailing end of the film unwound from the supply reel.

6. In a camera the optical system of which has an optical axis which is stationary relative to the camera housing, for making motion pictures in parallel longitudinal rows on a film strip, in combination, in addition to said optical system, a camera housing, means for supporting a film supply reel, an additional reel for temporarily holding the film, means for supporting the additional reel, a pressure guide for the film adapted to hold the film in a plane at right angles to the optical axis during the exposure of a picture, at least one additional pressure guide adapted to guide the film after the exposure of a first component strip, means adapted to guide the film outside the reels and pressure guides on a predetermined path and to twist the film through 180° about its center line, means for reversing the feed direction of the twisted film into the opposite direction, a turntable adapted to carry the reels and their supports, the pressure guides and at least part of the guide means for the film and to move them by its rotation to a position in which the optical axis intersects the second component strip of the film in a center line of the latter when the film is fed in the new direction.

7. In a camera as set forth in claim 6, said camera comprising further, in combination, means adapted to rethread into the supply reel the trailing end of the film unwound from the supply reel, said means comprising guide elements for the film, part of said guide elements being movable, control means adapted to change the position of the movable guide elements.

8. In a camera as set forth in claim 6, said camera comprising further, in combination, shoes carrying the pressure guides, slides forming said shoes, said slides being constructed to be movable relative to the turntable, control means adapted to operate the slides and to vary the radial distance from the pressure guides to the axis of rotation of the turntable.

9. A camera the optical system of which has an optical axis which is stationary relative to the camera housing, for making exposures in mutually parallel strips, said camera comprising, in combination, a camera housing, means for feeding the film by increments corresponding to the distance between frames, a guide for the film adapted to hold the film in a plane at right angles to the optical axis during the exposure of a picture, and control means for turning at least said guide and at least a portion of the film through 180° between a first position in which the optical axis intersects the film on the longitudinal line of symmetry of a first longitudinal strip constituting one-half of the film and a second position in which the optical axis intersects the film on the longitudinal line of symmetry of a second longitudinal strip constituting the other half of the film, said feeding means being adapted to transport the film in each of said first and second positions; and actuating means for sensing the film and actuating said control means when sensing the trailing end of the film after said film has passed in said first position through said guide.

10. In a camera the optical system of which has an optical axis which is stationary relative to the camera housing, for making exposures in parallel longitudinal rows on a film strip, said camera comprising, in combination, a normally closed camera housing, means for supporting a film supply reel, an additional reel for temporarily holding the film, means for supporting said additional reel, a pressure guide permanently located within said camera housing for holding the film in a plane at right angles to the optical axis during exposure of a picture, and control means for turning in said closed camera housing at least said pressure guide and at least a portion of the film between a first position in which the optical axis intersects the film on the longitudinal line of symmetry of one of said rows and a second position in which the optical axis intersects the film on a longitudinal line of symmetry of the other of said rows, so that the exposure of said other row can take place after exposure of said one row without opening said camera housing.

11. In a camera as set forth in claim 10, wherein said pressure guide is turned about an axis parallel with said optical axis.

12. In a camera as set forth in claim 10, wherein said pressure guide is turned about an axis parallel to the plane of the film portion held in said pressure guide and perpendicular to said optical axis.

13. In a camera the optical system of which has an optical axis which is stationary relative to the camera housing, for making pictures in parallel longitudinal rows on a film strip, in combination, a normally closed housing, a guide permanently located within said camera housing adapted to hold the film in a plane at right angles to the optical axis during the exposure of a picture, and control means for turning in said closed camera housing at least said guide and at least a portion of the film through 180° between a first position in which the optical axis intersects the film on the longitudinal line of symmetry of one of said rows and a second position in which the optical axis intersects the film on the longitudinal line of symmetry of the other of said rows, so that the exposure of said other row can take place subsequently to the exposure of said one row without opening said camera housing.

References Cited by the Examiner

UNITED STATES PATENTS

| 1,969,484 | 8/34 | Stewart | 352—78 |
| 1,997,409 | 4/35 | May | 226—91 |
| 2,008,110 | 7/35 | Scheibell | 352—38 |
| 2,091,508 | 8/37 | Howell | 352—140 |
| 2,173,768 | 9/39 | Sabol et al. | 352—25 |
| 2,807,979 | 10/57 | Henriksen | 226—82 |

FOREIGN PATENTS

| 402,198 | 11/33 | Great Britain. |

NORTON ANSHER, *Primary Examiner.*

EMIL G. ANDERSON, WILLIAM MESIEK, *Examiners.*